United States Patent
Ho et al.

(10) Patent No.: US 7,549,009 B2
(45) Date of Patent: Jun. 16, 2009

(54) HIGH-SPEED PCI INTERFACE SYSTEM AND A RESET METHOD THEREOF

(75) Inventors: Kuan-Jui Ho, Taipei (TW); Wen-Yun Chen, Taipei (TW)

(73) Assignee: Via Technologies, Inc., Taipei (TW)

( * ) Notice: Subject to any disclaimer, the term of this patent is extended or adjusted under 35 U.S.C. 154(b) by 164 days.

(21) Appl. No.: 11/619,047

(22) Filed: Jan. 2, 2007

(65) Prior Publication Data

US 2007/0156934 A1 Jul. 5, 2007

(30) Foreign Application Priority Data

Jan. 2, 2006 (TW) ............................... 95100104 A

(51) Int. Cl.
*G06F 13/00* (2006.01)
(52) U.S. Cl. ...................................... 710/313; 710/107
(58) Field of Classification Search .................. 710/107, 710/305, 313
See application file for complete search history.

(56) References Cited

U.S. PATENT DOCUMENTS

| | | | | |
|---|---|---|---|---|
| 2002/0118204 A1* | 8/2002 | Aleksic et al. | ............... | 345/544 |
| 2006/0164072 A1* | 7/2006 | Ng et al. | ................... | 324/158.1 |
| 2007/0240018 A1* | 10/2007 | Nalawadi et al. | ............... | 714/23 |
| 2007/0283059 A1* | 12/2007 | Ho et al. | ...................... | 710/104 |

* cited by examiner

*Primary Examiner*—Glenn A Auve
(74) *Attorney, Agent, or Firm*—Rosenberg, Klein & Lee

(57) ABSTRACT

A high-speed PCI interface system with reset function and a reset method thereof are provided. The interface system comprises a host controller chipset, at least one high-speed PCI device and at least one reset signal generator. While a hot reset packet cannot be executed by the high-speed PCI device, the host controller chipset can respectively transmit a trigger signal and a PCI reset signal to each corresponding reset signal generator through a trigger signal line and a PCI reset signal line, and further the reset signal generator operates to generate a basic resetting signal. Finally, the basic resetting signal will be transmitted to the corresponding high-speed PCI device through a basic reset signal line such that the system can be used to operate the basic resetting action without restarting power.

20 Claims, 6 Drawing Sheets

HIGH-SPEED PCI INTERFACE SYSTEM AND A RESET METHOD THEREOF

FIELD OF THE INVENTION

The present invention relates to a high-speed PCI interface, more particularly to a high-speed PCI interface system with reset function and a reset method thereof.

BACKGROUND OF THE INVENTION

Since the electrical industry has changed with each passing day, the CPU and chipset are advancing constantly, such that the transmission speed of the PCI interface is the choke point or bottle neck for the ultimate speed of the computer system. Now the high-speed PCI (PCI Express) is presented, having more advantages such as high-performance, enhanced bandwidth, advanced power management function, hot swap/plug, point to point transmission and serial connection, which are desired by users such that manufacturers develop related electronic products with the high-speed PCI interface. However, since the software and hardware of the computer system are powerful and high-speed, the stable operation thereof is important to the user, such that every manufacturer strives toward these goals.

Usually, while the user is operating the computer, the computer may crash, for example: the high-speed PCI device falls into an endless loop or becomes unable to be awakened from Suspend to RAM (STR) of the hibernate mode. Now, if the computer system adopts a high-speed PCI device with PCI Express interface, which sends a hot reset packet to the out-of-control high-speed PCI device for constructing a normal coupling with the computer system.

Referring to FIG. 1, it is shown that the electrical connections diagram of the system with high-speed PCI interface of the prior art. As shown in the figure, the system 10 comprises a north bridge 11 with at least one root port 111, at least one high-speed PCI device 13 and a south bridge 15. When the power is engaged, the south bridge 15 can transmit a PCI resetting signal (PCI RST#) to a buffer 112 through a PCI reset signal line 151, and then the buffer 112 can transmit the PCI resetting signal to the high-speed PCI device 13 through a reset signal line 113 such that the system 10 will proceed with an initializing action for the high-speed PCI device 13. After the system 10 is finished with the initializing action, the user can operate the system 10 normally. When the high-speed PCI device 13 fails to communicate with the north bridge 11 normally, the system 10 will adopt the root port 111 for transmitting a hot reset packet to the high-speed PCI device 13 through a high-speed PCI bus 117, such that the high-speed PCI device 13 will proceed with the initializing action to communicate normally with the north bridge 11 again. However, the high-speed PCI device 13 may not be able to execute the hot reset packet, the only way to reset the high-speed PCI device 13 is to turn off and then turn on the power again. In other words, this will cost a lot of time of the user to do so.

SUMMARY OF THE INVENTION

The present invention provides a high-speed PCI interface system with reset function, comprising: a host controller chipset, comprising at least one root port, used to generate a PCI resetting signal; at least one high-speed PCI device, each of said at least one high-speed PCI device respectively coupled to a corresponding one of said at least one corresponding root port within said host controller chipset through a high-speed PCI bus; and at least one reset signal generator, corresponding with one of said at least one root ports, each of said at least one reset signal generators being respectively electrically coupled to said host controller chipset through a PCI reset signal line and a trigger signal line, and being electrically coupled to a corresponding one of said at least one high-speed PCI device through a basic reset signal line; wherein, each of said at least one reset signal generator receiving said PCI resetting signal and a triggering signal through said PCI resetting signal line and said trigger signal line, generating a basic resetting signal, sending said basic resetting signal to said corresponding one of said at least one high-speed PCI device through said basic reset signal line, and then commanding said corresponding one of said at least one high-speed PCI device to execute a basic resetting action.

The present invention also provides a reset method for using the high-speed PCI interface system, comprising the following steps of: a corresponding root port sending out a hot reset packet to a high-speed PCI device for executing a hot resetting action through a corresponding high-speed PCI bus; determining whether said high-speed PCI device is ready, and if so, then ending; if not, then generating a basic resetting signal to said high-speed PCI device for executing a basic resetting action; and again determining whether said high-speed PCI device is ready, if so, then ending; if not, then again generating a basic resetting signal to said high-speed PCI device for executing said basic resetting action.

DETAILED DESCRIPTION OF THE PREFERRED EMBODIMENT

Figure 1:
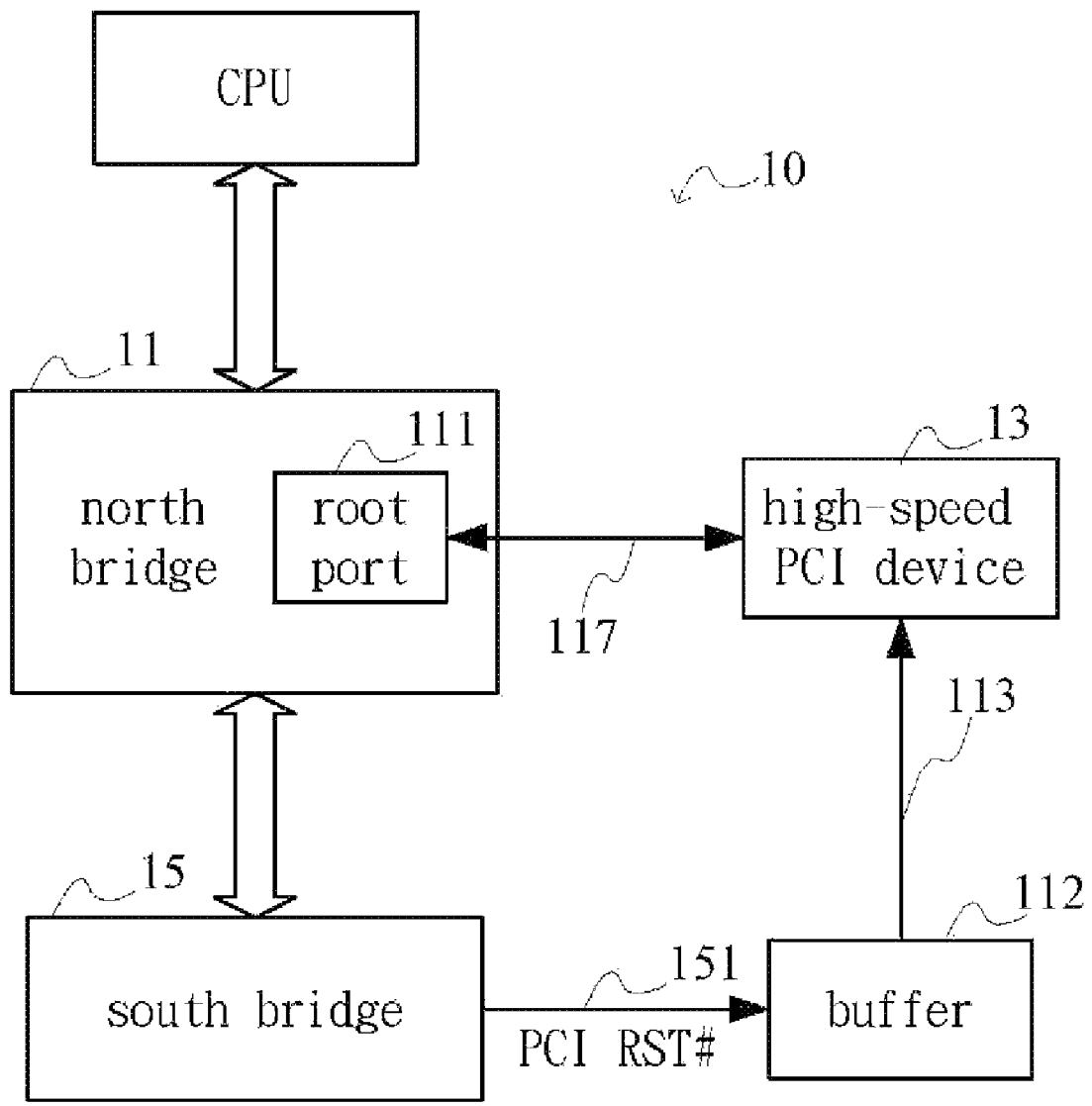
FIG. 1 is a block diagram of the system with high-speed PCI interface of the prior art.
Figure 2:
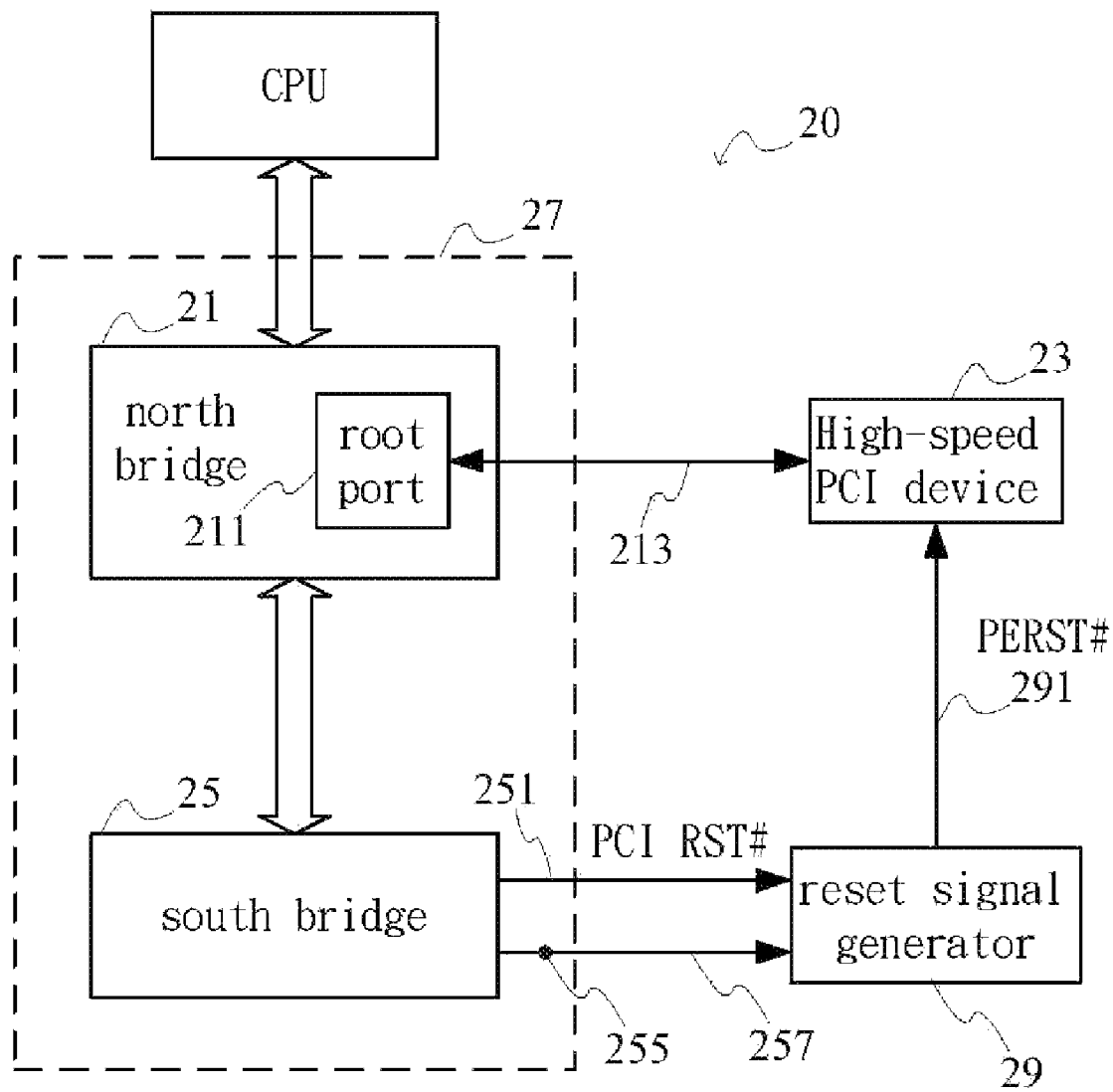
FIG. 2 is a block diagram according to a preferred embodiment of the present invention.

Referring to FIG. 2, it is a block diagram according to a preferred embodiment of the present invention. As shown in the figure, the high-speed PCI interface system 20 of the present invention comprises a host controller chipset 27, at least one high-speed PCI device 23 (PCI Express) and at least one reset signal generator 29.

Wherein, at least one root port 211 is placed within the host controller chipset 27, and each root port 211 is coupled to a corresponding high-speed PCI device 23. Each high-speed PCI device 23 is respectively coupled to the corresponding root port 211 within the host controller chipset 27 through a corresponding high-speed PCI bus 213. In the present embodiment, the number of the reset signal generators 29 corresponds to the number of the root ports 211. The reset signal generators 29 and the host controller chipset 27 are separately placed within the motherboard (not shown).

The host controller chipset 27 comprises the general-purpose output pin 255; the number of the general-purpose output pins 255 corresponds to the number of the reset signal generators 29, each general-purpose output pin 255 is respectively coupled to a corresponding input end of each reset signal generator 29 through a corresponding trigger signal line 257, and another input end of each reset signal generator 29 is simultaneously coupled to a PCI reset signal line 251. When the system starts, the host controller chipset 27 can transmit the PCI resetting signal (PCI RST#) to the input end of the reset signal generator 29 through the PCI reset signal line 251, and further the reset signal generator 29 operates to generate a basic resetting signal (PERST#), which is then transmitted to each high-speed PCI device 23 through the basic reset signal line 291, thus, the system can proceed with the basic reset action while the system is starting.

Besides, some high-speed PCI devices can't resume a normal operating mode after the system restarts and also renders the hot reset action inoperative. The host controller chipset 27 can use the corresponding general-purpose output pin 255 to transmit a triggering signal to the reset signal generator 29 through the trigger signal line 257. Now, the reset signal generator 29 operates the triggering signal to generate a basic resetting signal (PERST#) that will be transmitted to the high-speed PCI device 23, which will proceed with the basic resetting action, and then the high-speed PCI device 23 can restore the normal operating state.

In a general computer system, the host controller chipset 27 may often be designed into the pattern that consists of a north bridge 21 and a south bridge 25. The root port 211 is directly placed within the north bridge 21 under this pattern, and the PCI resetting signal (PCI RST#) is transmitted from the south bridge 25 through the PCI reset signal line 251. In addition, each general-purpose output pin 255 is placed on the south bridge 25 and respectively coupled to the corresponding reset signal generator 29 through the corresponding triggering signal line 257.

Figure 3:
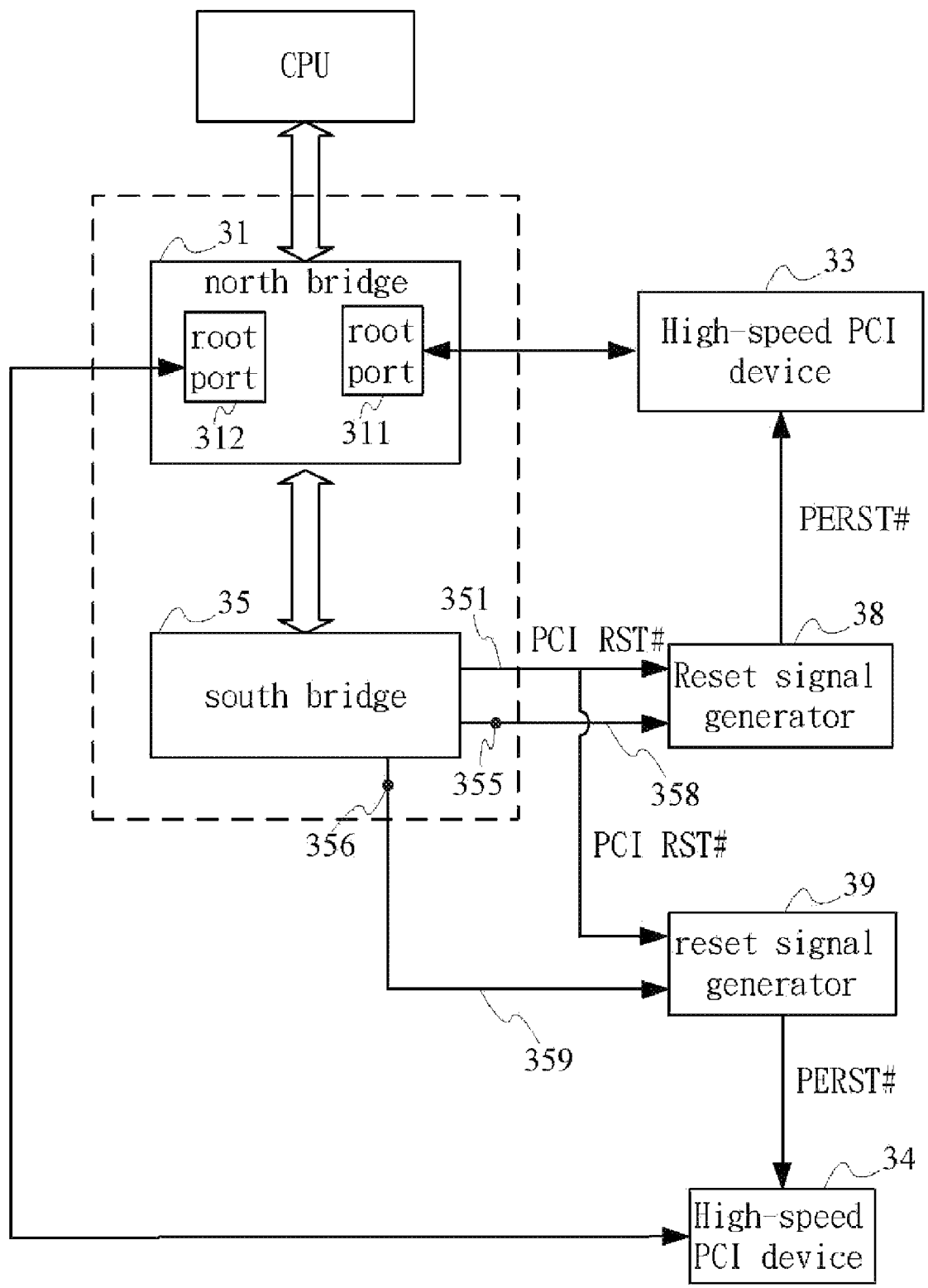
FIG. 3 is a block diagram according to another embodiment of the present invention.

Referring to FIG. 3, there is shown the block diagram of another embodiment of the present invention. As shown in the figure, the main structure is approximately the same as the embodiment shown in FIG. 2. However, the present embodiment comprises two high-speed PCI devices 33,34, two reset signal generators 38, 39 and two root ports 311,312 that are placed within the north bridge 31. The manner of electrical-coupling of each corresponding component of the present embodiment and the above-mentioned embodiment are the same, and therefore no longer discussed here.

Wherein, the reset signal generators 38, 39 are coupled in parallel and respectively coupled to south bridge 35 through a PCI reset signal line 351, therefore, the reset signal generators 38, 39 can simultaneously receive the PCI resetting signal that is outputted from the south bridge 35. The south bridge 35 comprises the general-purpose output pins 355, 356, and the number of the general-purpose output pins 355, 356 corresponds to the number of the reset signal generators 38 and 39. Thus, the reset signal generators 38 and 39 may be respectively electrically coupled to the corresponding general-purpose output pins 355 and 356 through the triggering signal lines 358 and 359.

Moreover, the south bridge 35 can transmit a triggering signal to the corresponding reset signal generator 38 or 39 when any one of the high-speed PCI device 33, 34 encounters a problem. The corresponding reset signal generator 38, 39 will transmit a basic resetting signal (PERST#) to the high-speed PCI device 33 or 34 that encounters the problem, so the high-speed PCI device 33 or 34 can execute the basic resetting action.

Figure 4:
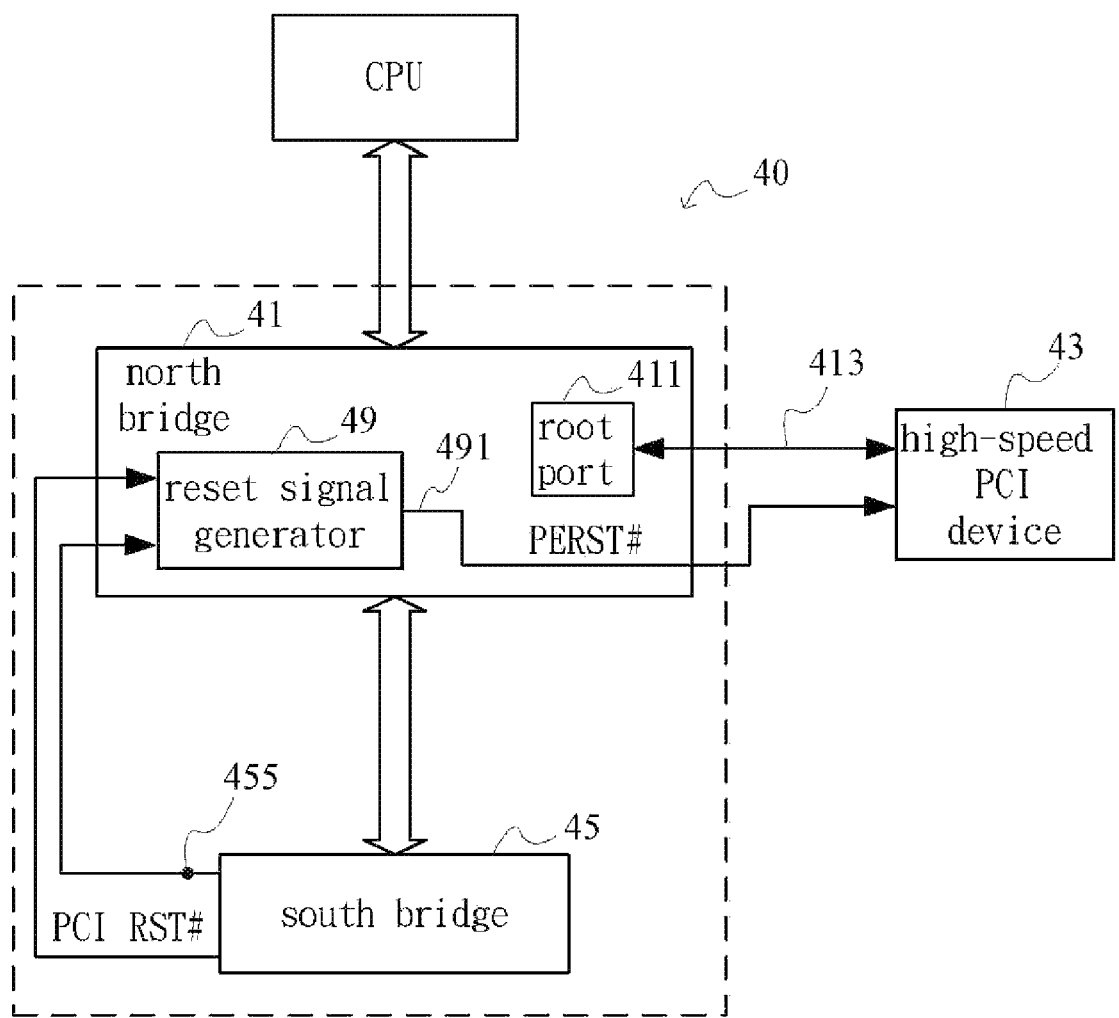
FIG. 4 is a block diagram according to another embodiment of the present invention.

Referring to FIG. 4, there is shown a block diagram of another embodiment of the present invention. As shown in the figure, except for the north bridge 41, the main structure of the high-speed PCI interface system 40 of the present embodiment is approximately the same as the embodiment of FIG. 2. The difference thereof is that the reset signal generator 49 is directly integrated into the north bridge 41, and the high-speed PCI device 43 is coupled to the root port 411 within the high-speed PCI interface system 40 through a corresponding high-speed PCI bus 413. The reset signal generator 49 can receive the PCI reset signal (PCI RST#) from the south bridge 45 and the triggering signal that is outputted from the corresponding general-purpose output pin 455. The reset signal generator 49 generates a basic reset signal (PERST#) that will be transmitted to the corresponding high-speed PCI device 43 through the corresponding basic reset signal line 491 such that the high-speed PCI device 43 can execute the basic resetting action. This will help to reduce the circuit layout size of the high-speed PCI interface system 40 and reach the design idea to make the system light, thin, short and small.

Each reset signal generator (29, 38, 39 or 49) of the above-mentioned embodiments can be an AND gate, and each high-speed PCI device (23, 33, 34 or 43) may be selected from one of an image processing chip, a sound processing chip, a bridge or a complex root port.

Figure 5:
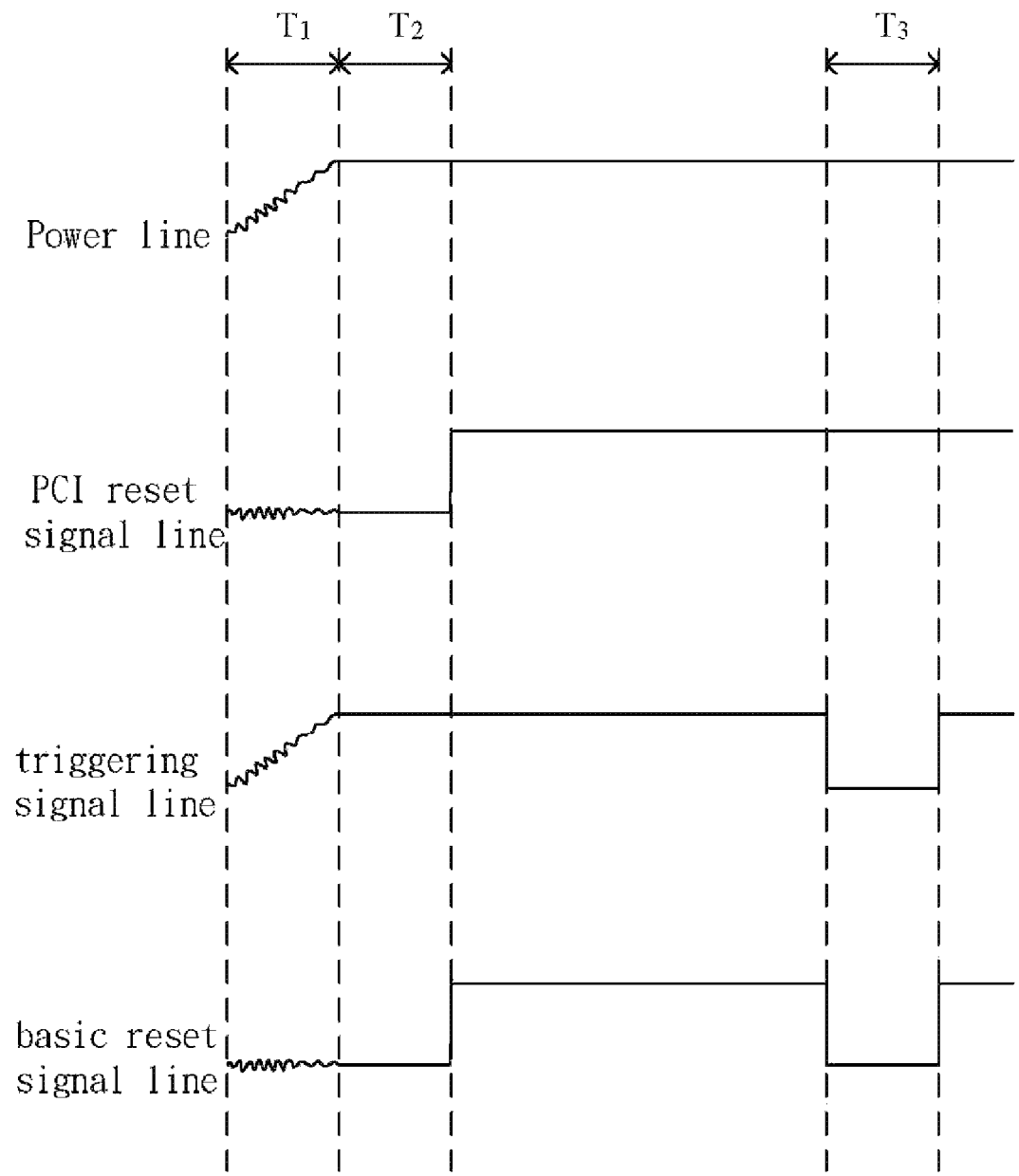
FIG. 5 is a timing diagram of each main signal of the present invention.

Referring to FIG. 5, there is shown a timing diagram of each main signal of the present invention. As shown in the figure, when the computer system turns on power to operate a starting procedure, the power source leads an initial stage of power-on, each related circuit is in an unstable state during the T1 transient time. After T1 time ends, the system will tend to stabilize. During the T2 time, the system will first proceed with the initialize action of each component, and then the south bridge will transmit out the PCI resetting signal.

The PCI reset signal is asserted in the low voltage, such that the PCI reset signal is in the low-level voltage state during the T2 time, while the triggering signal will be deasserted in the high-level voltage state. Each reset signal generator simultaneously receives two signals, and further generates a basic resetting signal of low-level voltage through the digital logic (as an AND gate) within the reset signal generator. The basic resetting signal will be transmitted to each high-speed PCI device, such that each high-speed PCI device can be used to operate the initialization action of the basic reset according to the basic reset signal. The computer system can enter the normal operation state after all components are finished the initialization action.

If some high-speed PCI device falls into an endless loop after the following operating process, or can't be normally coupled to the north bridge for other reasons, or can't be awakened from STR mode, the high-speed PCI device can adopt the technology of the present invention, which will transmit out a triggering signal with low-level voltage from the corresponding general-purpose output pin of the south bridge. Thus, the corresponding reset signal generator can generate a basic reset signal with low-level voltage, as shown in the figure during T3 time. The above-mentioned technology can force the corresponding high-speed PCI device to proceed with the basic reset action without restarting power. Then, the high-speed PCI device can again resume a normal coupling to the north bridge.

Figure 6:
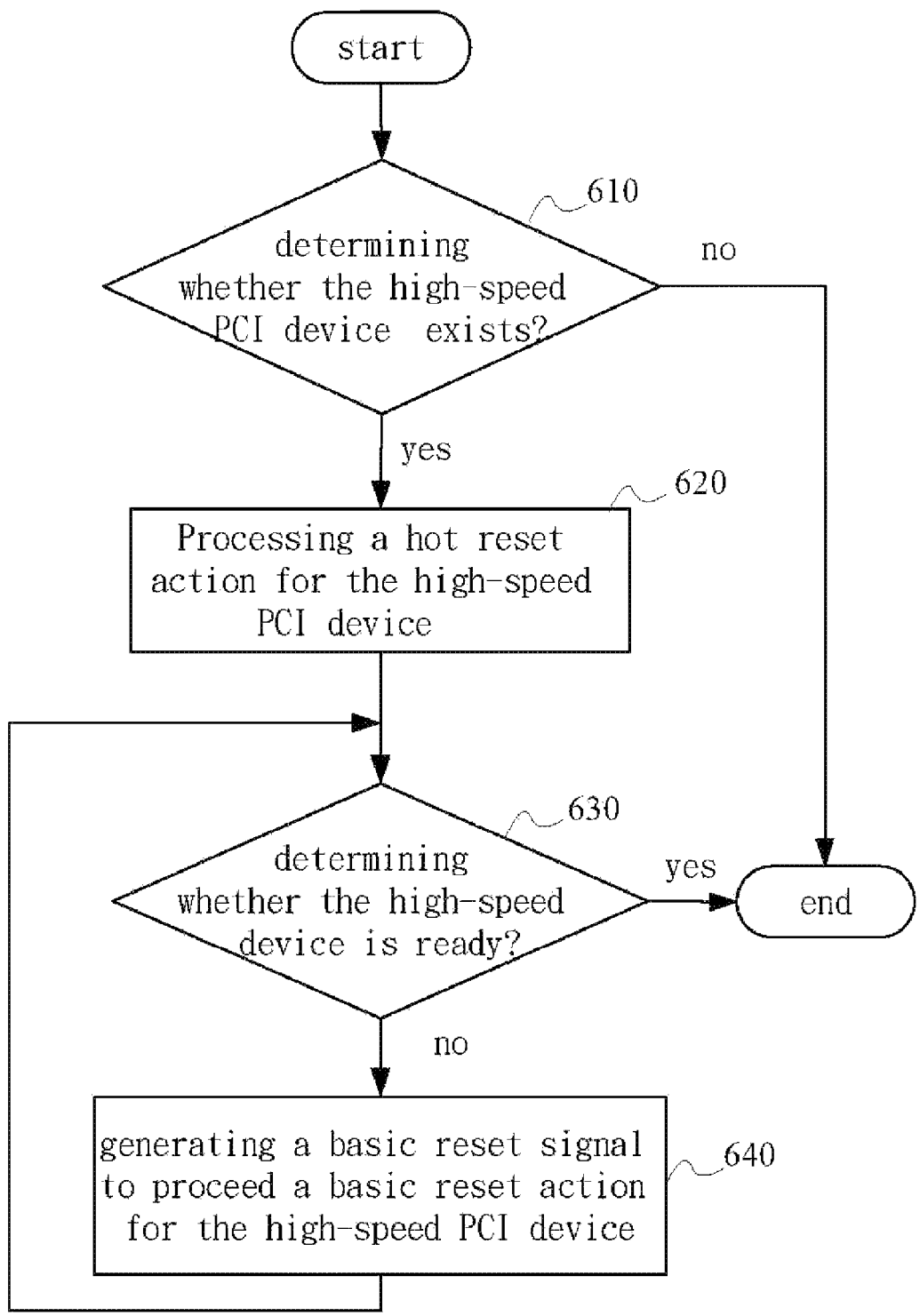
FIG. 6 is a flowchart according to a preferred embodiment of the present invention.

Finally, referring to FIG. 6, there is shown a flowchart of a reset method of a preferred embodiment of the present invention. As shown in the figure, the reset method of the present invention is used on the high-speed PCI device of the system if it fails to respond or an error occurs. First, the reset method is executed: the step 610 determines whether the high-speed PCI device exists. If not, it shows that the high-speed PCI device has already been removed and directly ends the reset procedure; if the high-speed PCI device has not been removed, it continues to step 620 and the follow-up steps thereof. Thus, when the high-speed PCI device is removed, the system can avoid continuously transmitting the command packet to the high-speed PCI device ignorant of its condition. If the high-speed PCI device has already been determined to exist, the step 610 isn't necessary, and can be omitted according to the condition.

Then, when the step 620 is proceeding, a hot reset packet is transmitted to the high-speed PCI device through the corresponding high-speed PCI bus for proceeding with the hot reset action.

Next, when the step 630 is proceeding, a determination is made whether the high-speed PCI device is ready through the root port. If so, it is shown that the high-speed PCI device has been already normally coupled to the north bridge and directly ends the reset procedure; if not, step 640 proceeds. The south bridge generates a triggering signal from the corresponding general-purpose output pin by means of software, firmware, hardware or the combination thereof. Thus, the triggering signal line will turn into the low-level voltage, and then a basic reset signal with low-level voltage will be transmitted to the high-speed PCI device from the reset signal generator, then the high-speed PCI device can proceed with the basic resetting action. Therefore, the system can again generate a basic resetting signal for the high-speed PCI device to operate the initialization action without resetting power.

After the basic resetting action is finished, the step 630 will be again detecting to thereby form a circulatory process, which will stop once the high-speed PCI device can be normally coupled to the north bridge. The present technique not only retains the data that is generated by the previously completed work, but also ensures the normal operation of the high-speed PCI device.

In summary, it is appreciated that the present invention relates to a high-speed PCI interface system with reset function and a reset method thereof, that uses a reset signal generator to generate a basic resetting signal, and which directly transmits to the corresponding high-speed PCI device such that the system can be used to operate the basic resetting action without restarting power.

The foregoing descriptions are merely exemplary embodiments of the present invention and should not be considered restrictive. All equivalent variations and modifications in process, method, features, and spirit in accordance with the appended claims may be made without in any way departing from the scope of the invention.

What is claimed is:

1. A high-speed PCI interface system with reset function, comprising:
    a host controller chipset, comprising at least one root port, used to generate a PCI resetting signal;
    at least one high-speed PCI device, each of said at least one high-speed PCI device respectively coupled to a corresponding one of said at least one root port within said host controller chipset through a high-speed PCI bus; and
    at least one reset signal generator, corresponding with one of said at least one root port, each of said at least one reset signal generator being respectively electrically coupled to said host controller chipset through a PCI reset signal line and a trigger signal line, and being electrically coupled to a corresponding one of said at least one high-speed PCI device through a basic reset signal line;
    wherein, each of said at least one reset signal generator respectively receiving said PCI resetting signal and a triggering signal through said PCI reset signal line and said trigger signal line, generating a basic resetting signal, sending said basic resetting signal to said corresponding one of said at least one high-speed PCI device through said basic reset signal line, and then commanding said corresponding one of said at least one high-speed PCI device to execute a basic resetting action.

2. The high-speed PCI interface system of claim 1, wherein said triggering signal is generated by means of software, firmware, hardware or a combination thereof.

3. The high-speed PCI interface system of claim 1, wherein said host controller chipset comprises a north bridge and a south bridge.

4. The high-speed PCI interface system of claim 3, wherein said at least one root port is placed within said north bridge, and said reset signal is generated by said south bridge.

5. The high-speed PCI interface system of claim 4, wherein said triggering signal is generated by means of software, firmware, hardware or the combination thereof.

6. The high-speed PCI interface system of claim 4, wherein each of said at least one reset signal generator is located in a motherboard or said north bridge.

7. The high-speed PCI interface system of claim 3, wherein said south bridge further comprises at least one general purpose output pin which is corresponding with a corresponding one of said at least one reset signal generator, and each of said at least one general purpose output pin is coupled to a corresponding one of said at least one reset signal generator through a corresponding trigger signal line.

8. The high-speed PCI interface system of claim 1, wherein each of said at least one reset signal generator can be an AND gate.

9. The high-speed PCI interface system of claim 1, wherein each of said at least one high-speed PCI device is selected from one of an image processing chip, a sound processing chip, a bridge and a complex root port.

10. A reset method for using the high-speed PCI interface system, comprising the following steps of:
    sending out a hot reset packet to a high-speed PCI device for executing a hot resetting action through a corresponding high-speed PCI bus;
    determining whether said high-speed PCI device is ready, if so, then end; if not, then generating a basic resetting signal to said high-speed PCI device for executing a basic resetting action; and
    determining whether said high-speed PCI device is ready, if so, then end; if not, then again generating a basic reset signal to said high-speed PCI device for executing said basic resetting action.

11. The reset method of claim 10, wherein said reset method further comprises:
    determining whether said high-speed PCI device exists before said step of sending out said hot reset packet, if so, then determining whether said high-speed PCI device is ready; if not, then end.

12. The reset method of claim 10, wherein said basic reset signal is generated from a reset signal generator in operation of a triggering signal sent by a host controller chipset.

13. The reset method of claim 12, wherein said host controller chipset comprises a north bridge and a south bridge.

14. The reset method of claim 13, wherein said triggering signal is generated by means of software, firmware, hardware or the combination thereof.

15. The reset method of claim 14, wherein said south bridge further comprises a general purpose output pin which is corresponding with said reset signal generator, and said general purpose output pin is coupled to said reset signal generator through a triggering signal line.

16. The reset method of claim 13, wherein a root port is located in said north bridge, and a PCI reset signal is generated by said south bridge.

17. The reset method of claim 12, wherein said reset signal generator is located in a motherboard or in a north bridge.

18. The reset method of claim 12, wherein said reset signal generator is an AND gate.

19. The reset method of claim 10, wherein said high-speed PCI device is selected from one of an image processing chip, a sound processing, a bridge and a complex root port.

20. The reset method of claim 10, wherein said reset method further comprises:
    determining whether said high-speed PCI device is ready before said step of executing said hot resetting action.

* * * * *